Nov. 9, 1965 D. R. TAYLOR, JR 3,217,102

SYNC SEPARATOR ACHIEVING NOISE IMMUNITY BY INTERMITTENT INTERRUPTION OF COMPOSITE VIDEO SIGNAL AT TWICE HORIZONTAL SCANNING FREQUENCY

Filed Oct. 29, 1962 2 Sheets-Sheet 1

WAVEFORMS IN GATE & SYNC CIRCUITS

INVENTOR.
DONALD R. TAYLOR, JR.
BY
Robert D. Santon
ATTORNEY

SYNC SEPARATOR ACHIEVING NOISE IMMUNITY BY INTERMITTENT INTERRUPTION OF COMPOSITE VIDEO SIGNAL AT TWICE HORIZONTAL SCANNING FREQUENCY

Filed Oct. 29, 1962 2 Sheets-Sheet 2

COMBINED GATE AND SYNC SEP. (GATED SYNC SEP.)

FUNCTIONAL DIAGRAM OF GATING SYSTEM

INVENTOR.
DONALD R. TAYLOR, JR.
BY
Robert D. Sanborn
ATTORNEY

United States Patent Office 3,217,102
Patented Nov. 9, 1965

3,217,102

SYNC SEPARATOR ACHIEVING NOISE IMMUNITY BY INTERMITTENT INTERRUPTION OF COMPOSITE VIDEO SIGNAL AT TWICE HORIZONTAL SCANNING FREQUENCY

Donald R. Taylor, Jr., Philadelphia, Pa., assignor to Philco Corporation, Philadelphia, Pa., a corporation of Delaware Filed Oct. 29, 1962, Ser. No. 233,739
6 Claims. (Cl. 178—69.5)

*Introduction*

Figure 1:
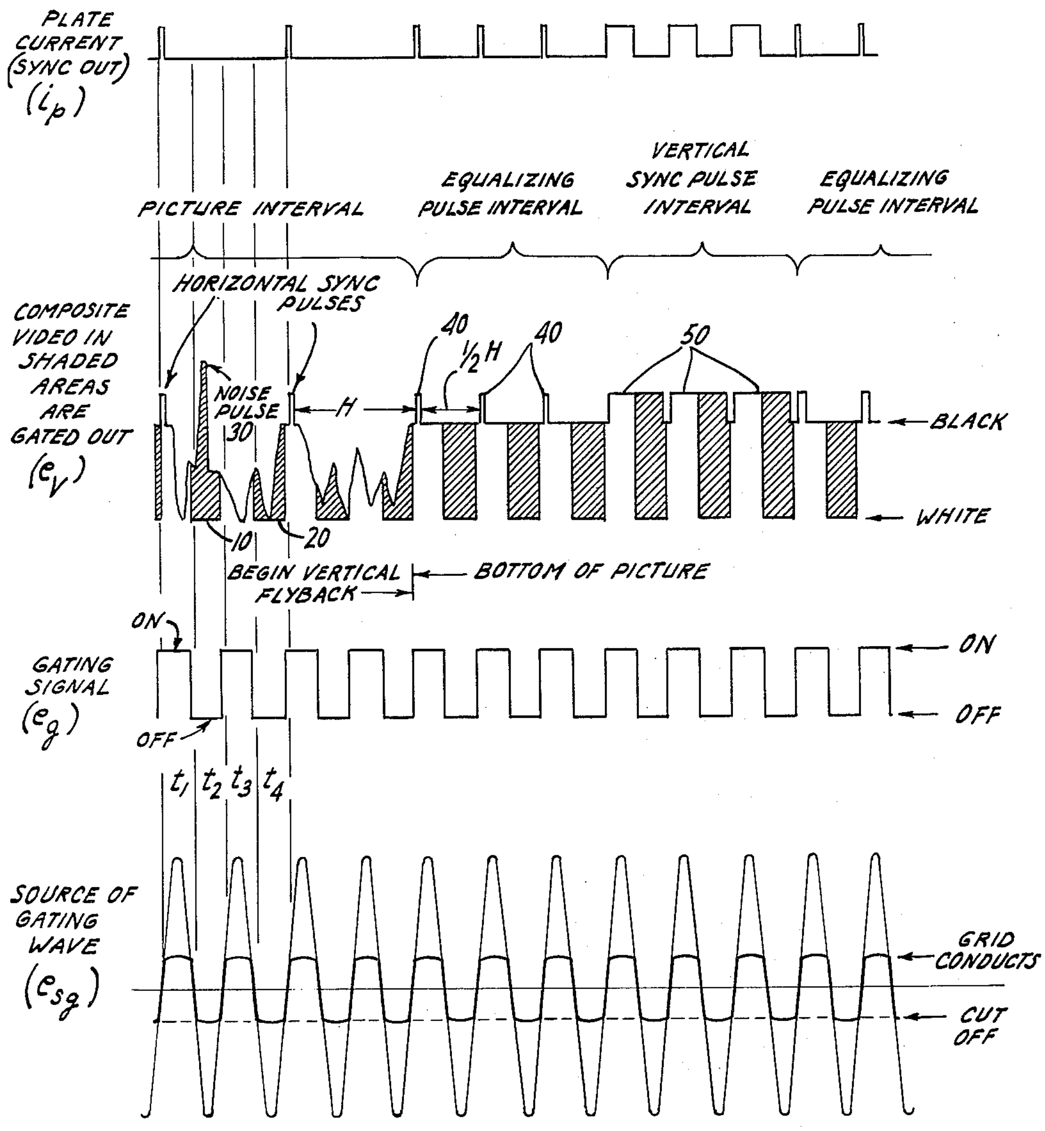

This invention relates to television, and more particularly to synchronizing (sync) separators used in television receivers. A sync separator is normally used in a television receiver to separate the sync signals (which occur during the horizontal and vertical flyback intervals) from the video signal. Such separation is effected by voltage amplitude sensitive circuitry inasmuch as the sync signals in a composite video signal occupy an amplitude range exterior to that of the video signal per se.

For good receiver operation the sync separator must pass only sync signals and not extraneous signals such as noise or video information. If extraneous signals are allowed to pass through the sync separator they may cause adverse effects, such as undesired capacitance charging and false synchronizing of the vertical and horizontal oscillators, precipitating loss of picture stability.

Sync separators normally are able to block video signals per se to a high degree because of the aforementioned fact that the video and sync signals lie in mutually exclusive amplitude ranges. However, noise signals (such as ignition pulses), when present in the composite video signal, because of their relatively great strength, may occupy both video and sync amplitude ranges, preventing the exclusively amplitude-sensitive sync discriminator from blocking such noise signals, and therefore resulting in the possible disruption of picture stability during the presence of noise.

In addition, noise pulses may charge the sync separator input coupling capacitor or capacitors to an abnormal level, so that the operation of the sync separator may be upset for an interval after the noise has disappeared.

It can be seen from the foregoing that it would be desirable if means were available to render a television sync separator immune to noise impulses present in the composite video signal.

*Prior approach*

One way in which a high degree of sync separator noise immunity has been heretofore effected has been by gating or intermittently blocking a composite video-sync signal for discrete intervals before the video portion thereof is clipped in the sync separator. Gating, of course, must occur only during portions of the video or sweep intervals of the composite signal so that the sync information can be applied intact to the sync separator. Gating removes a large amount of the non-sync information from the composite video-sync signal before it is applied to the sync separator, and thus a large portion of the potential noise in the composite signal never reaches the sync separator—where its passage could cause eventual adverse effects, as explained supra.

Sync gating is not presently used, however, because of the difficulty of deriving a gating signal which is compatible with the standard composite video-sync signal. Because of the complex nature of the composite signal, gating at any simple frequency will destroy part of the sync information contained therein. For instance, gating at the horizontal frequency, $f_H$, will destroy the equalizing pulses which provide correct interlacing. Gating at the vertical frequency, $f_V$, will clearly destroy much of the horizontal sync information.

*Summary*

In the present invention the sync separator is gated at double the horizontal frequency. I have discovered that the use of a gating rate of twice the horizontal frequency enables gating to be performed without loss of sync information as would otherwise occur. The invention is exemplified in two systems: one wherein a gate is placed before a conventional sync separator, and another wherein a combined gate-sync separator is utilized.

*Objects*

Accordingly the objects of the present invention are: (1) to provide new and improved sync separation apparatus, (2) to provide a noise immune sync separator, (3) to provide a gated sync separator for use with a composite video signal which includes equalizing pulses, and (4) to provide a novel combined gate-sync separator. Other objects and advantages of the invention will become apparent from a consideration of the following description thereof.

*Drawings*

Figure 3:
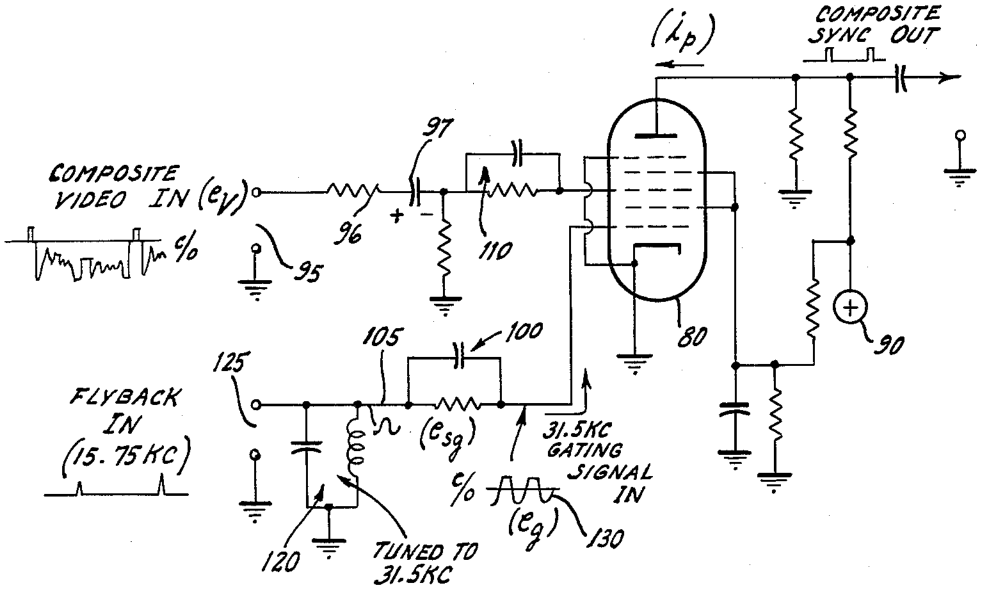
Figure 2:
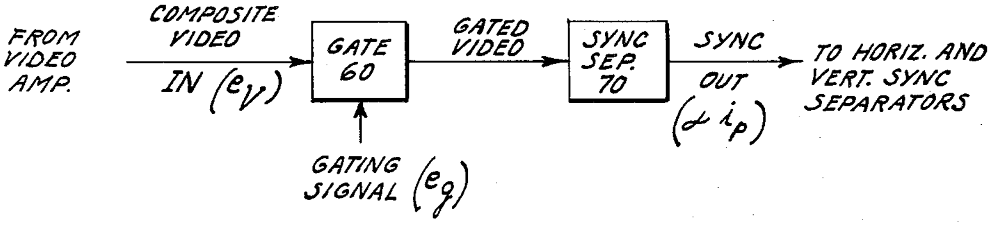

In the drawings:

FIG. 1 shows various waveforms in the gating and sync circuits of a television receiver utilizing the system of present invention, FIG. 2 shows a block diagram of apparatus embodying the invention, and FIG. 3 shows an embodiment of the invention wherein gating and sync separation functions are performed within a single tube envelope.

*FIG. 1*

Reference is first made to waveform $e_V$ and $e_g$ in FIG. 1 of the drawings wherein is illustrated the effect on the composite video signal of a gating waveform according to the invention which has a frequency of $2f_H$.

During the intervals $t_1$, $t_3$, etc., of gating signal ($e_g$), the standard composite video signal ($e_V$) is allowed to pass, but during intervals $t_2$, $t_4$, etc., the video signal ($e_V$) is blocked. The shaded areas of the video signal, e.g., 10 and 20, represent those areas which are gated out. A noise pulse 30 occurring during the gating interval $t_2$ would thus be eliminated before it could reach the sync separator. In addition gating removes a large percentage of the video signal to reduce substantially the extraneous information which would otherwise reach the sync separator.

The use of a gating signal ($e_g$) having a frequency of twice that of the horizontal sync pulses ($2f_H$) permits intermittent blockage of the composite video ($e_V$) without loss of sync information. Notice that none of the shaded areas in waveform ($e_V$) includes leading edges of the sync pulses 40 and 50. The phase of the gating signal $e_g$ should be adjusted to secure this result.

To avoid loss of vertical sync information, the duty cycle of the gating pulse waveform $e_g$ should not be substantially less than 50%; otherwise the sync pulses occurring during the vertical sync pulse interval will be unduly shortened and will not properly affect the integrating vertical sync separator, as will be apparent to those conversant with the art. As is evident from an inspection of waveform $e_V$ during the vertical sync pulse interval, the use of gating does decrease the duty cycle of the vertical pulses. This of course decreases the amplitude of the vertical sync pulses after integration, but their noise content is concomitantly decreased.

*FIG. 2.—Block diagram*

The invention is diagrammatically depicted in FIG. 2. A gating circuit 60 is interposed between a conventional sync separator 70 and the video amplifier which supplies the composite video signal $e_V$. The gate 60 is supplied with a gating signal $e_g$ (shown in FIG. 1) which causes the gate to become alternately transmissive and nontransmissive when the gating signal is high and low, respectively.

The gating signal $e_g$ may be easily obtained in a number of ways. If the receiver contains a source of sinusoidal signal of twice the horizontal frequency ($2f_H$), the gating wave can be obtained by a simple symmetrical clipping operation. If it contains no such source, the flyback pulses, which occur at the horizontal frequency $f_H$, may be fed to a doubler (e.g., a circuit tuned to $2f_H$) to obtain the $2f_H$ signal. Other methods of generating the gating wave will be readily apparent to the skilled artisan.

*FIG. 3.—Combined gate and sync separator*

The circuit of FIG. 3 performs the gating and clipping functions of the FIG. 2 arrangement within a single functional unit. A multigrid tube 80, advantageously a heptode, is supplied with the composite video signal $e_V$ on its third grid, while the gating signal $e_g$ is supplied to the first grid. The tube is biased by power supply 90 and its associated bias impedances. The composite sync output signal is obtained at the plate.

The circuit functions as follows. A sinusoidal gating signal present at point 105 overdrives the control grid through the series R-C impedance 100 to alternately cut the tube on and off so that the gating action of the invention will be performed on the composite video signal $e_V$ which is applied to grid #3 by way of terminals 95.

Sync separation is also performed in the tube because the video signal applied to grid #3 (from terminals 95, through resistor 96, capacitor 97, and R-C impedance 110) initially causes grid #3 to draw a current which charges capacitor 97 as shown. This charge places a negative bias on grid #3 at a level such that the video portions of signal $e_V$ cut tube 80 off, while the sync tips of signal $e_V$ cut tube 80 on, so that only the "blacker than black" or sync part of the composite video passes, as is well understood.

A desirable way to obtain the gating signal is to apply flyback pulses, which occur at frequency $f_H$, to resonant circuit 120 tuned to $2f_H$. These flyback pulses may be supplied by way of terminal 125. This yields a sine wave 130 of frequency $2f_H$ at an amplitude such that the positive peaks cause grid #1 to draw current and the negative peaks to cut the heptode off so that wave 130 is clipped as shown. In this manner the heptode is effectively gated according to waveform $e_g$ in FIG. 1.

A tetrode or pentode may be used in lieu of a heptode for the gate-sync separator. Frequency values have been shown in FIG. 3 in accordance with current domestic practice. The invention is applicable to color and monochrome television receivers as well as to vacuum tube and transistor circuits.

The instant invention is not limited to the specificities of the above description since many modifications thereof which still fall within the true scope of the inventive concept will be apparent to those conversant with the art. The invention is defined only by the appended claims.

I claim:

1. In combination:

(a) a source of composite video signal comprised of video information portions alternating with (1) horizontal flyback portions which contain horizontal sync pulses and (2) vertical flyback portions which contain vertical sync pulses, equalizing sync pulses, and horizontal sync pulses, (b) gating means for intermittently interrupting said composite video signal at a rate equal to double the rate of occurrence of said horizontal sync pulses and at a phase such that said horizontal sync pulses, said equalizing sync pulses, and at least the leading portions of said vertical sync pulses are not affected, and (c) means for separating said sync pulses from said interrupted composite video signal.

2. A gated sync separator for a television receiver of the type utilizing a composite video signal which includes video information in one amplitude range thereof and vertical and horizontal sync pulses in another amplitude range thereof comprising: a vacuum tube having at least two grids; means for applying a recurrent gating signal having a frequency equal to twice the frequency of said horizontal sync pulses to a first of said grids at a phase such that said tube tends to be cut off for at least a portion of the intervals when said composite signal is representative of video signal to a second of said grids such that the sync information portion of said composite video signal tends to cut on said tube and the video information portion of said composite video signal tends to cut off said tube.

3. The separator of claim 3 wherein said tube is a heptode, said gating signal is applied to the first grid thereof and said composite video signal is applied to the third grid thereof.

4. A gated sync separator with high noise immunity for separating sync information from a composite video signal comprised of video information intervals interspersed with (1) horizontal flyback intervals which contain horizontal sync pulses and (2) vertical flyback intervals which contain vertical sync pulses, sync equalizing pulses, and horizontal sync pulses comprising: a vacuum tube having at least two grids; means for applying a gating signal to a first of said grids, said gating signal tending to alternately cut said tube off and on at a frequency double the frequency of said horizontal sync pulses, the phase of said gating signal being such that said tube is cut on during the occurrence of said horizontal sync pulses, said sync equalizing pulses, and at least the leading portion of said vertical sync pulses; and means for applying said composite video signal to a second of said grids at a level such that the video portions of said composite signal tend to cut off said tube and the sync portions of said composite signal tend to cut on said tube.

5. The separator of claim 5 wherein said gating signal is applied to said first grid through an impedance and at a level such that the positive peaks of said gating signal cause a voltage drop to appear across said impedance.

6. The separator of claim 5 wherein said tube is a heptode.

References Cited by the Examiner

UNITED STATES PATENTS

| | | | |
|---|---|---|---|
| 2,431,577 | 11/47 | Moore | 178—69.5 |
| 2,497,413 | 2/50 | Lindley | 178—69.5 |
| 2,761,010 | 8/56 | Bridges | 178—7.5 |

OTHER REFERENCES

Walker, editor; N.A.B. Handbook, 1960, 5th edition, McGraw-Hill, New York, pages 6–155 through 6–159.

DAVID G. REDINBAUGH, *Primary Examiner.*

STEPHEN W. CAPELLI, *Examiner.*